(12) United States Patent
Furutsu

(10) Patent No.: US 6,227,728 B1
(45) Date of Patent: *May 8, 2001

(54) OPTICAL APPARATUS

(75) Inventor: Etsuro Furutsu, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,934

(22) Filed: Feb. 18, 1999

(30) Foreign Application Priority Data

Feb. 25, 1998 (JP) .................................................. 10-059061

(51) Int. Cl.⁷ .................................................. G03B 17/00

(52) U.S. Cl. ............................................................ 396/439

(58) Field of Search ..................................... 396/236, 300, 396/48, 49, 158, 529, 279, 439, 622

(56) References Cited

U.S. PATENT DOCUMENTS

| | | | |
|---|---|---|---|
| 5,053,797 | * 10/1991 | Samuels et al. | 396/300 |
| 5,132,716 | * 7/1992 | Samuels et al. | 396/622 |
| 5,481,326 | * 1/1996 | Yasukawa | 396/279 |
| 5,721,983 | 2/1998 | Furutsu | 396/158 |
| 5,828,911 | * 10/1998 | Miyazawa | 396/300 |
| 5,905,921 | * 5/1999 | Miyazawa | 396/300 |

FOREIGN PATENT DOCUMENTS 8-320834   12/1996   (JP) .

* cited by examiner

Primary Examiner—W. B. Perkey
(74) Attorney, Agent, or Firm—Fitzpatrick, Cella, Harper & Scinto

(57) ABSTRACT

A camera having a memory in which control programs are stored includes a flash memory in which a control program or data for controlling the camera is stored, and a masked ROM in which a program for determining whether the control program or data stored in the flash memory is proper is stored, wherein the program stored in the masked ROM is executed in advance of execution of the control program stored in the flash memory.

13 Claims, 2 Drawing Sheets

OPTICAL APPARATUS

BACKGROUND OF THE INVENTION

1. Field of the Invention

The present invention relates to an optical apparatus equipped with a microcomputer having an unrewritable memory and a rewritable non-volatile memory.

2. Description of Related Art

Heretofore, cameras equipped with a one-chip microcomputer and arranged to perform a film transport control, an exposure control, a focus adjusting control and the like by using the microcomputer have been proposed. Generally, in such types of cameras, when the power source is turned on, a reset circuit cancels a reset state of the microcomputer so as to start executing a control program installed in the microcomputer.

Also, in recent years, cameras having a microcomputer containing therein a flash ROM (flash read-only memory), which is a rewritable non-volatile memory, have come into practical use. Accordingly, it has become possible to adapt the camera to a newly-developed accessory by modifying a control program after the production of the camera.

However, there is a problem that if, when a program is being written in the flash ROM, the contents of the flash ROM are destroyed due to some accidents, the camera would perform an abnormal operation.

Also, as disclosed in Japanese Laid-Open Patent Application No. Hei 8-320834, a method for preventing malfunction of a program written in the flash ROM has been proposed, in which correct check-sum values for the horizontal and vertical directions are beforehand stored in an EEPROM (electricaly erasable programmable read-only memory), a check-sum value of a program to be executed is calculated before an ordinary operation, and it is verified whether the calculated check-sum value coincides with the check-sum value stored in the EEPROM. However, since, in such a method, a program for calculating a check-sum value is written in the flash ROM, if the check-sum calculating program itself has any defect, not only cannot the check-sum value be calculated, but also malfunction cannot be prevented.

BRIEF SUMMARY OF THE INVENTION

In accordance with one aspect of the present invention, there is provided a camera having a memory in which control programs are stored, the camera comprising a flash memory in which a control program or data for controlling the camera is stored, and a masked ROM in which a program for determining whether the control program or data stored in the flash memory is proper, wherein the program stored in the masked ROM is executed in advance of execution of the control program stored in the flash memory, so that any impropriety in the control program or data stored in the flash memory can be known beforehand.

The above and further aspects and features of the present invention will become apparent from the following detailed description of a preferred embodiment thereof taken in conjunction with the accompanying drawings.

DETAILED DESCRIPTION OF THE INVENTION

Hereinafter, a preferred embodiment of the present invention will be described in detail with reference to the drawings.

Figure 1:
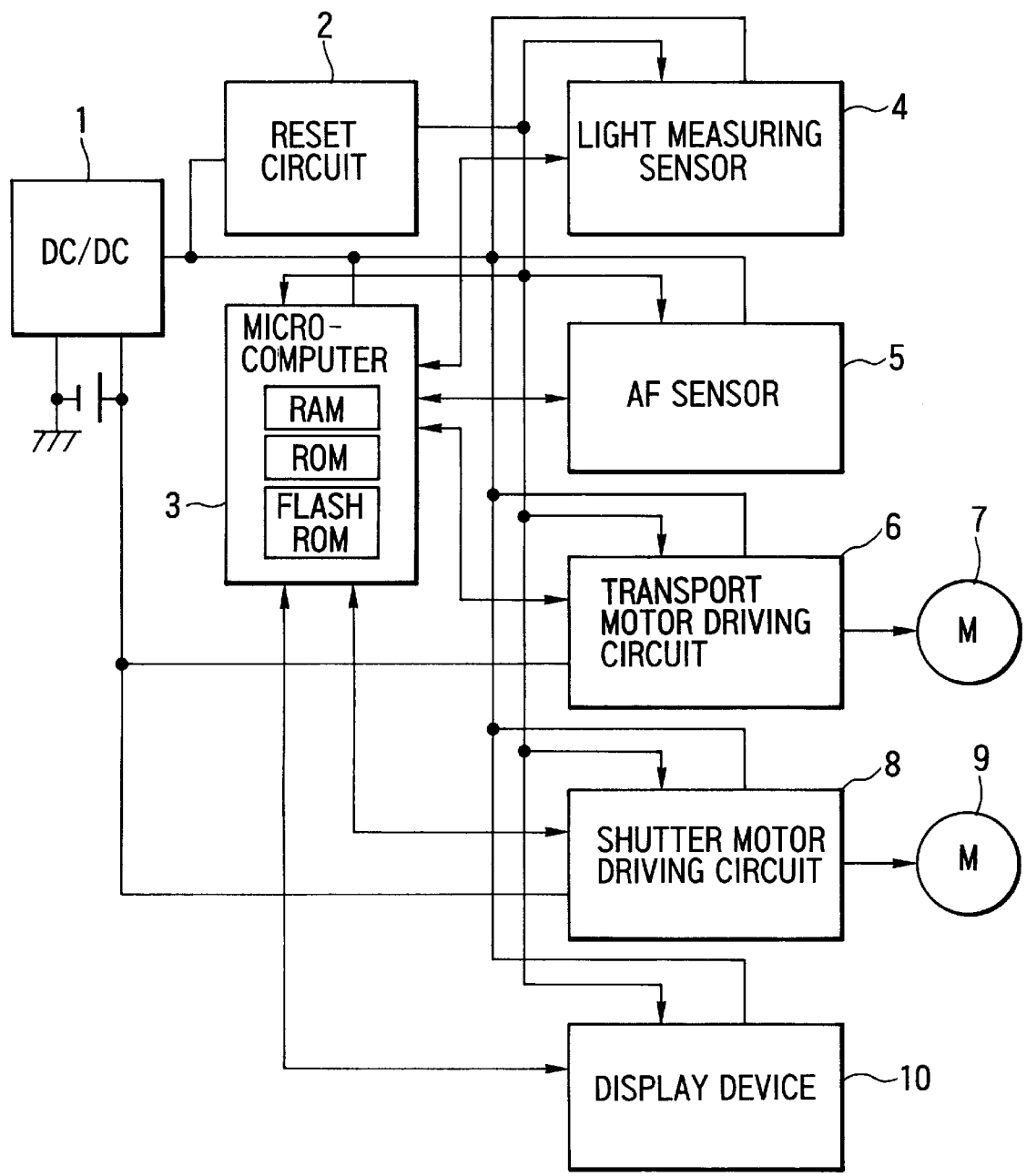
FIG. 1 is a block diagram illustrating the arrangement of an automatic focus adjusting camera according to an embodiment of the present invention.

FIG. 1 is a block diagram illustrating the schematic arrangement of an automatic focus adjusting camera according to the embodiment of the present invention. Referring to FIG. 1, reference numeral 1 denotes a DC/DC converter arranged to increase the voltage of a battery to a predetermined voltage and to output the predetermined voltage, reference numeral 2 denotes a reset circuit arranged to perform surveillance of the output voltage of the DC/DC converter 1 and to output a reset signal if the output voltage is equal to or less than the predetermined voltage, reference numeral 3 denotes a microcomputer (one-chip microcomputer) which contains therein a RAM, a masked ROM, a flash ROM, etc., reference numeral 4 denotes a light measuring sensor for measuring the brightness of a subject to be photographed, reference numeral 5 denotes an AF sensor for detecting the state of focusing of the subject, reference numeral 6 denotes a transport motor driving circuit for driving a transport motor 7 which feeds a film, reference numeral 8 denotes a shutter motor driving circuit for driving a shutter motor 9, and reference numeral 10 denotes a display device for displaying information or warnings of various types relating to the measured light values, detected state of focusing, and so forth.

Figure 2:
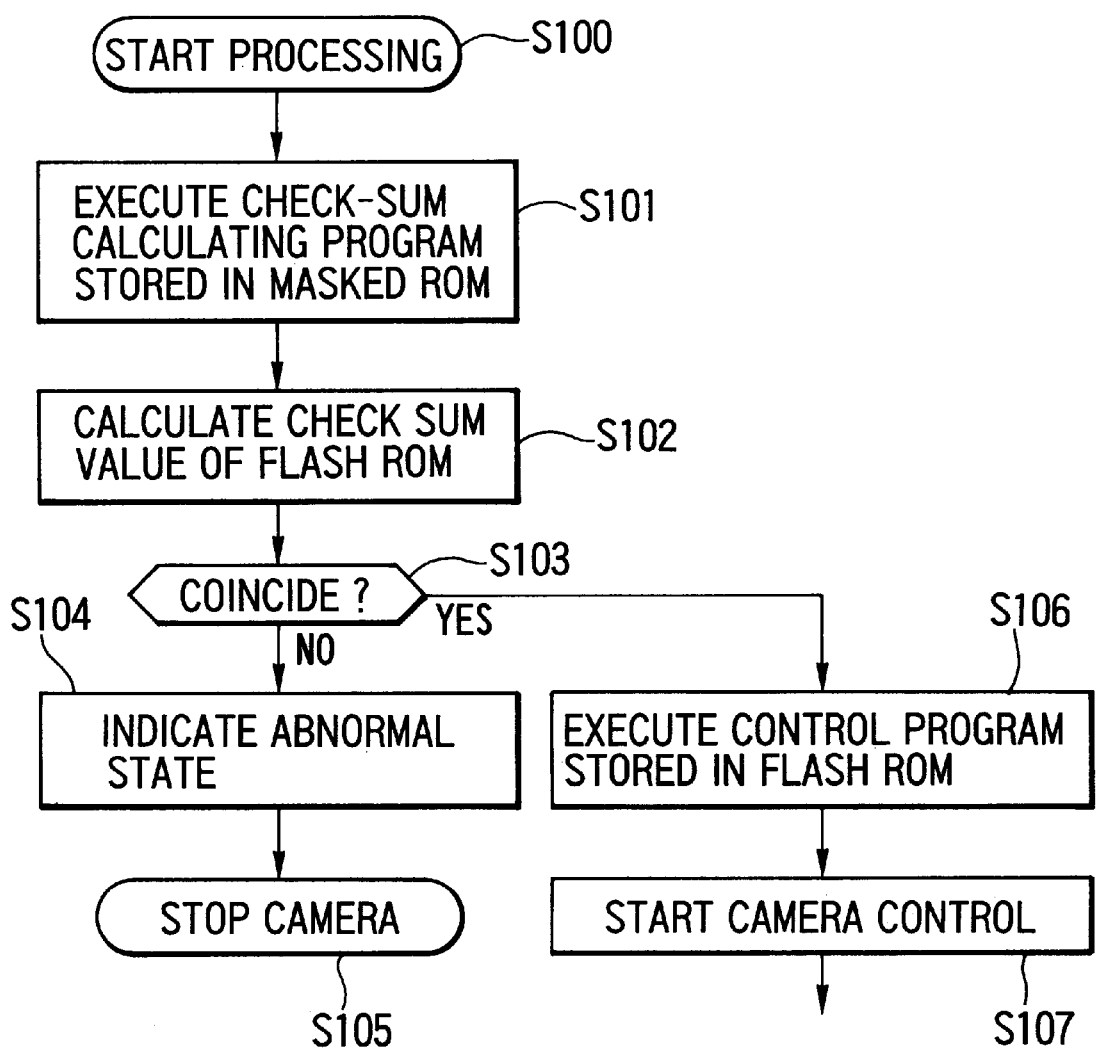
FIG. 2 is a flow chart illustrating the start-up operation of the camera according to the embodiment of the present invention.

FIG. 2 is a main flow chart illustrating the operation of the principal components of the camera arranged as described above, such a flow being stored in the masked ROM. The following description will be made with reference to FIG. 2.

When the battery is turned on, the DC/DC converter 1 starts supplying electric power to the electric circuitry. When the output voltage of the DC/DC converter 1 reaches the predetermined voltage, the reset circuit 2 cancels the reset state of the electric circuitry. Then, at a step S100, the microcomputer 3 starts operating and initializes an I/O (not shown) incorporated therein. At the next step S101, a check-sum calculating program stored in the masked ROM (unrewritable memory) starts being executed. Then, at a step S102, by using the check-sum calculating program, a check-sum value of a predetermined area of the flash ROM (rewritable memory) is calculated, and the calculated check-sum value is compared with a check-sum value stored in the flash ROM. More specifically, the total sum of memory contents from the leading address of the predetermined area to the final address thereof is calculated, the lower-order 8 bits of the calculated total sum are extracted as a check-sum value, and the extracted check-sum value is compared with a check-sum value also stored in the flash ROM.

At the next step S103, the microcomputer 3 checks whether or not the check-sum value calculated at the above step S102 coincides with the stored check-sum value. If so, the flow branches to a step S106. At the step S106, the control program and control data stored in the flash ROM are judged to be normal, and the microcomputer 3 begins executing the control program stored in the flash ROM. At a step S107, the control program stored in the flash ROM is executed, and the flow proceeds to an ordinary camera operation.

On the other hand, if it is determined that the check-sum value calculated at the above step S102 does not coincide with the stored check-sum value, the flow branches to a step S104. At the step S104, the control program and control data stored in the flash ROM are judged to be abnormal, so that a signal is sent to the display device 10 to indicate the abnormal state. Then, at a step S105, the subsequent processing is terminated, and the camera is stopped.

According to the above embodiment, the control program stored in the ROM, which is an unrewritable memory, is executed in advance of execution of the control program stored in the flash ROM, which is a rewritable non-volatile memory, thereby judging whether the control program and control data stored in the flash ROM are normal. If not, the control program and control data stored in the flash ROM are made not executed, thereby preventing beforehand malfunctioning of the camera.

Also, If the control program and control data stored in the FLASH ROM are not normal, a warning display indicative of an abnormal state is made, so that the user of the camera is not confused.

Despite the fact that a camera is a consumer-grade electronic device, cameras may be used under extreme conditions such as in temperatures as low as −30° C. or as high as 50° C. Particularly, in low temperatures, static electricity may be generated by the running of the film, and this static electricity may destroy the contents of the flash ROM. Accordingly, an arrangement for causing the camera to begin operating only after verifying whether the contents of the flash ROM are normal or not, as mentioned in the above embodiment, can prevent the control program stored in the flash ROM from running away. Such an arrangement, therefore, can very effectively be applied to the camera.

While in the above embodiment, an example is described of a camera serving as an apparatus equipped with a microcomputer having a rewritable non-volatile memory and an unrewritable memory, the present invention is by no means restricted to such an example. Rather, it is needless to say that the present invention can be applied to any optical apparatus equipped with a microcomputer such as described above.

What is claimed is:

1. An optical apparatus having a memory in which control programs are stored, said optical apparatus comprising:
   a first memory which is rewritable and in which is stored a control program or data for controlling said optical apparatus;
   a second memory which is unrewritable and in which is stored a program for determining whether the control program or data stored in said first memory is proper, without rewriting the control program or data stored in said first memory; and
   a microcomputer which performs an operation on the basis of the control program or data stored in said first memory and the program stored in said second memory, wherein when said microcomputer performs an operation, said microcomputer first performs the program stored in said second memory and then performs the control program or data stored in said first memory.

2. An optical apparatus according to claim 1, wherein said first memory is a flash memory.

3. An optical apparatus according to claim 1, wherein said second memory is a masked ROM.

4. An optical apparatus according to claim 1, wherein the program stored in said second memory is a program for calculating a check-sum value of a predetermined area of said first memory.

5. An optical apparatus according to claim 1, wherein the program stored in said second memory is a program for calculating a check-sum value of a predetermined area of said first memory, comparing the calculated check-sum value with a check-sum value stored beforehand in said first memory, and determining the control program or data stored in said first memory to be proper if the calculated check-sum value coincides with the stored check-sum value, or determining the control program or data stored in said first memory to be improper if the calculated check-sum value does not coincide with the stored check-sum value.

6. An optical apparatus according to claim 1, wherein the control program stored in said first memory is not executed if the control program or data stored in said first memory is determined to be improper by the program stored in said second memory.

7. An optical apparatus according to claim 1, further comprising:
   a display device which, if the control program or data stored in said first memory is determined to be improper by the program stored in said second memory, provides a warning display without executing the control program stored in said first memory.

8. A camera having memory in which control programs are stored, said camera comprising:
   a flash memory in which is stored a control program or data for controlling said camera;
   a masked ROM in which is stored a program for determining whether the control program or data stored in said flash memory is proper, without rewriting the control program or data stored in said flash memory; and
   a microcomputer which performs an operation on the basis of the control program or data stored in said flash memory and the program stored in said masked ROM, wherein when said microcomputer performs an operation, said microcomputer first performs the program stored in said masked ROM and then performs the control program or data stored in said flash memory.

9. A camera according to claim 8, wherein the program stored in said masked ROM is a program for calculating a check-sum value of a predetermined area of said flash memory.

10. A camera according to claim 8, wherein the program stored in said masked ROM is a program for calculating a check-sum value of a predetermined area of said flash memory, comparing the calculated check-sum value with a check-sum value stored beforehand in said flash memory, and determining the control program or data stored in said flash memory to be proper if the calculated check-sum value coincides with the stored check-sum value, or determining the control program or data stored in said flash memory to be improper if the calculated check-sum value does not coincide with the stored check-sum value.

11. A camera according to claim 8, wherein the control program stored in said flash memory is not executed if the control program or data stored in said flash memory is determined to be improper by the program stored in said masked ROM.

12. A camera according to claim 8, further comprising:
   a display device which, if the control program or data stored in said flash memory is determined to be improper by the program stored in said masked ROM, provides a warning display without executing the control program stored in said flash memory.

13. An optical apparatus having memory in which control programs are stored, said optical apparatus comprising:

a first memory which is rewritable and in which is stored a control program or data for controlling said optical apparatus;

a second memory which is unrewritable and in which is stored a program for determining whether the control program or data stored in said first memory is proper, without rewriting the control program or data stored in said first memory; and a microcomputer which performs an operation on the basis of the control program or data stored in said first memory and the program stored in said second memory, wherein when electric power is supplied to said optical apparatus, said microcomputer first performs an operation on the basis of the program stored in said second memory, and then performs an operation on the basis of the control program or data stored in said first memory.

* * * * *